Patented Nov. 2, 1926.

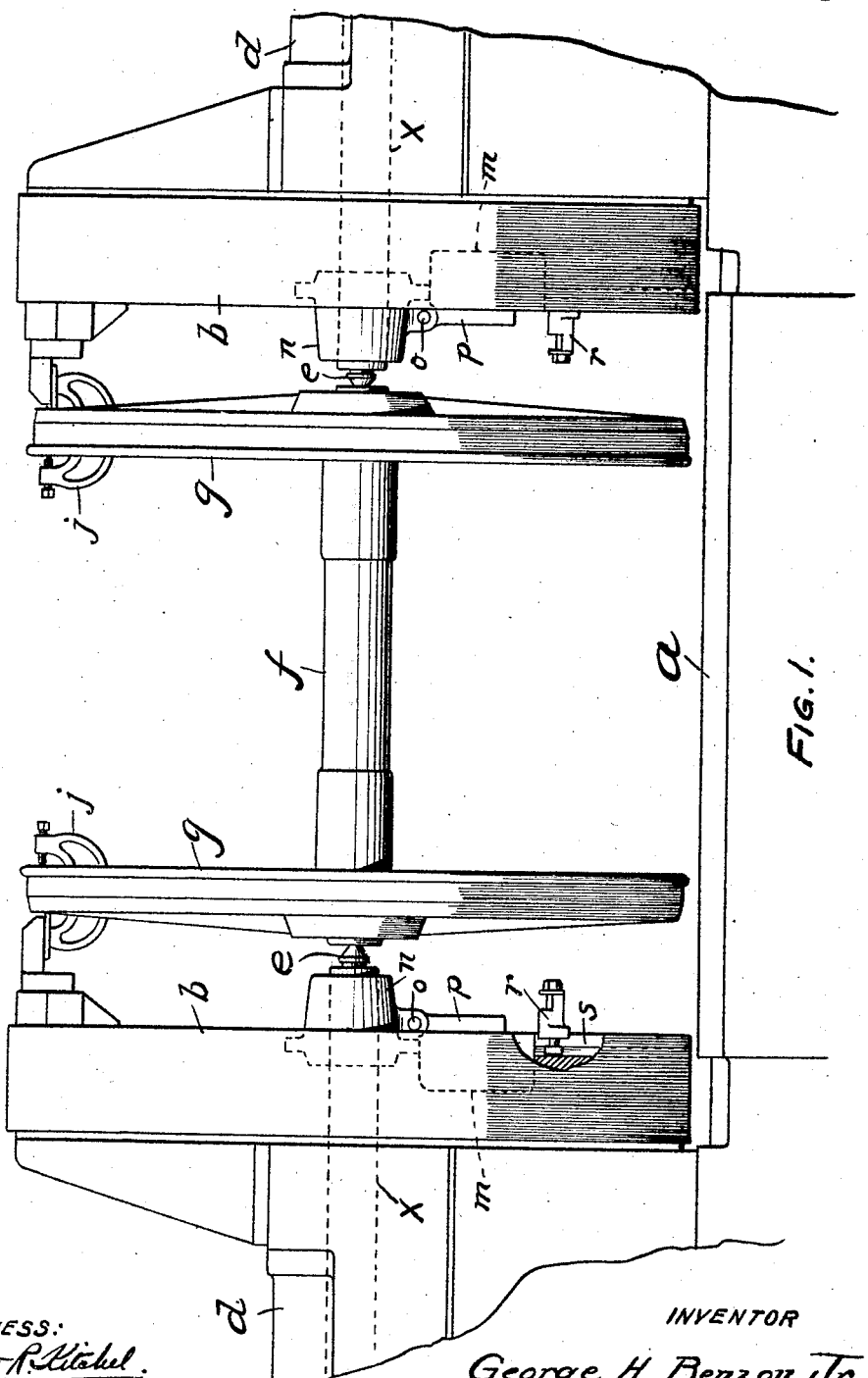

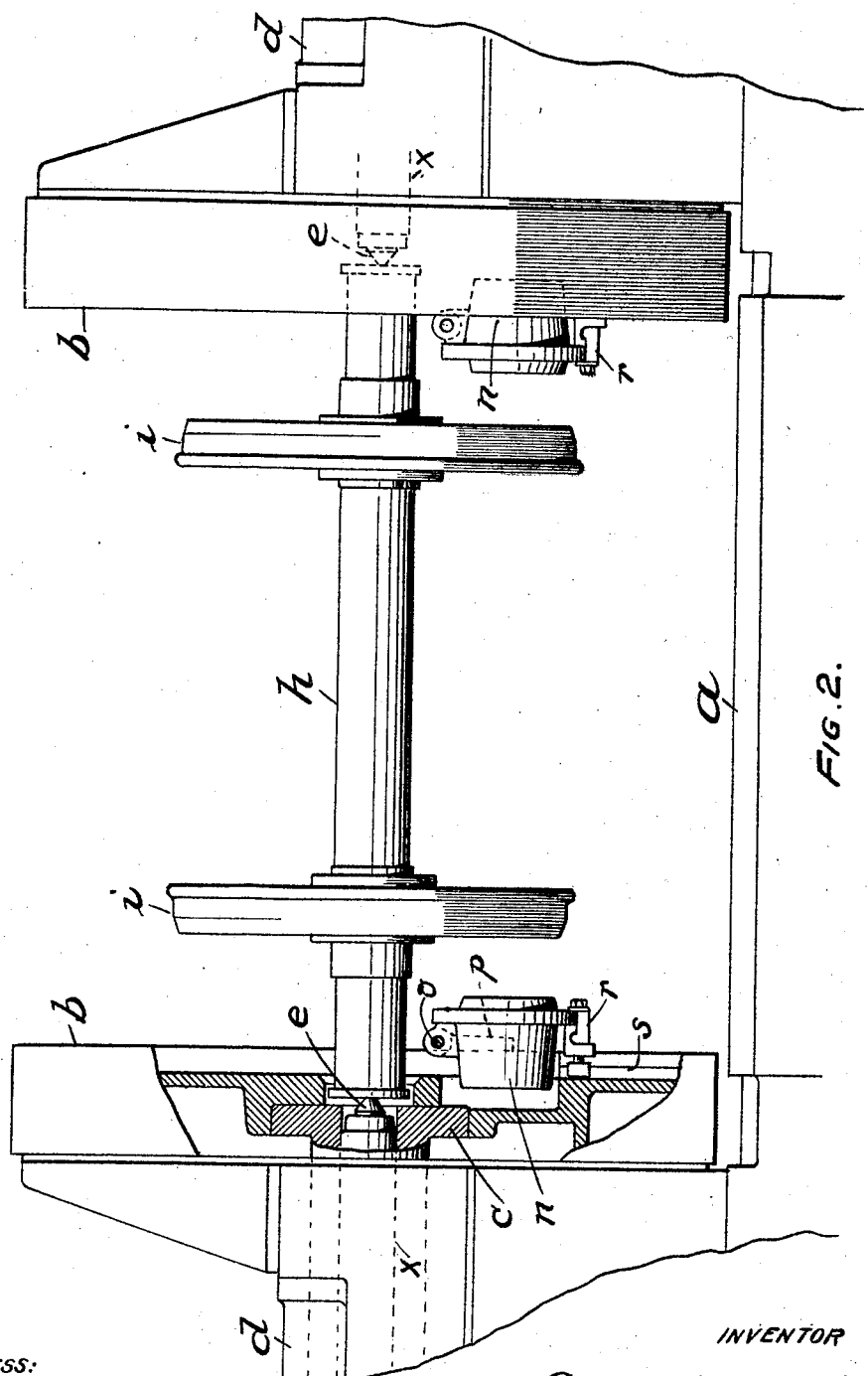

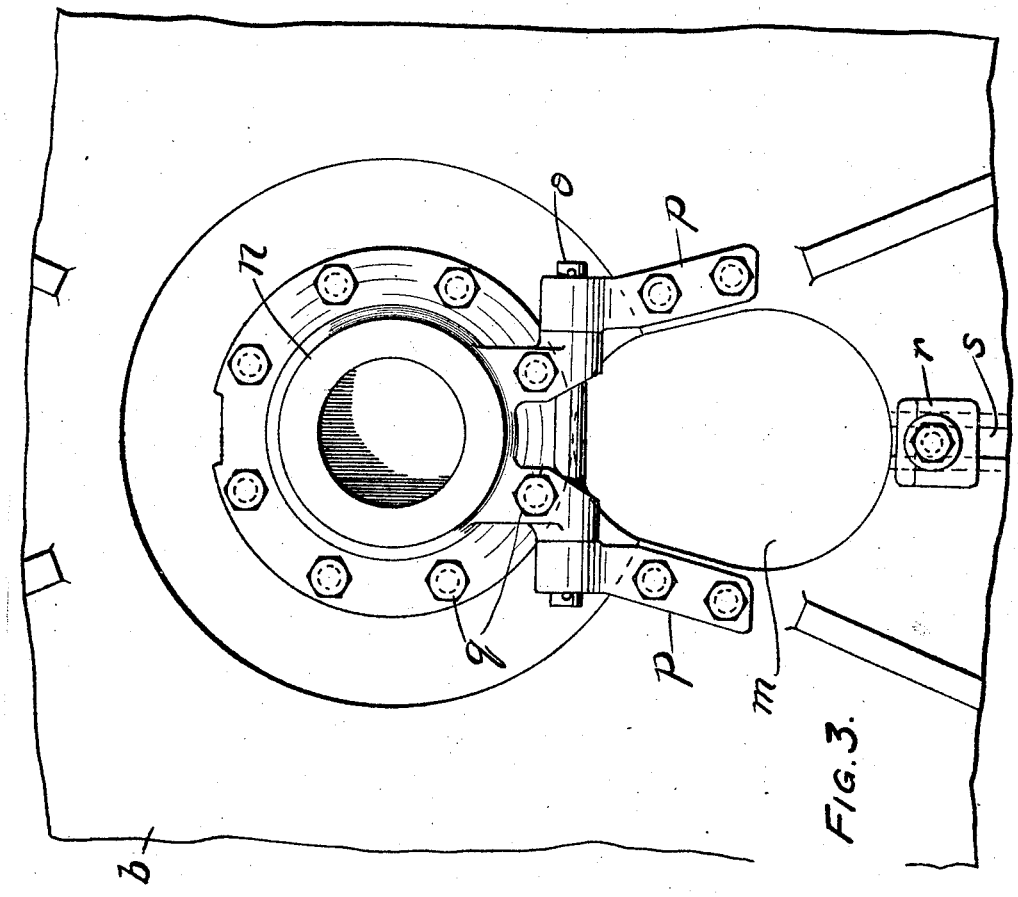
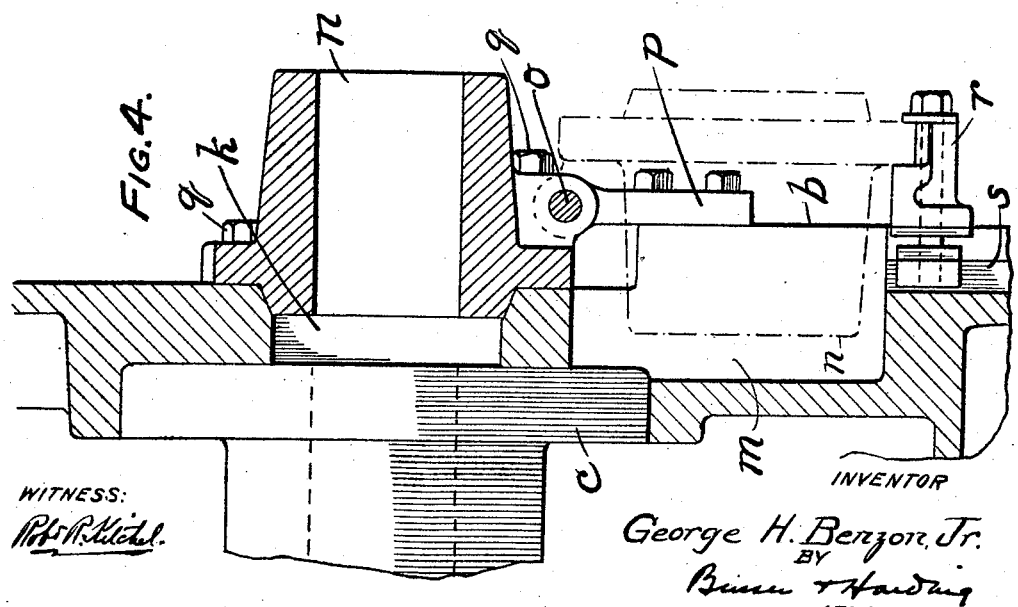

1,604,962

UNITED STATES PATENT OFFICE.

GEORGE H. BENZON, JR., OF JENKINTOWN, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

DRIVING-WHEEL LATHE.

Application filed December 8, 1925. Serial No. 73,964.

My invention relates to an improvement in wheel lathes, and more especially in that type of wheel lathe adapted to accommodate locomotive driving wheels.

Driving wheel lathes, as is well known, are required to accommodate the driving wheels of locomotives, in which the end of the axle is flush with the hubs, and also the trailer wheels, in which the ends of the axle extend beyond the outer faces of the wheels.

In lathes of the character indicated, the wheels to be machined are mounted in the lathe between centers, carried on sliding spindles which engage the ends of the axle. The wheels are driven by face plates, between which the wheels are supported by the centers and to which the wheels are secured by clamps. In order to facilitate clamping the wheels to the face plates and to effect an efficient drive of the wheels from the plates, the distance from the outside of the wheel rims to the face plates is desirably practically the same in the case of both driving wheels and trailer wheels.

In the mounting of driving wheels in the lathe, the centers are required to extend beyond the face plates, since the wheels are spaced therefrom and the ends of the axle engaged by the centers are flush with the wheel hubs. On the other hand, in the mounting of trailer wheels in the lathe, the centers are required to be withdrawn, since the ends of the axle extend beyond the wheels, and if the wheels be spaced desirably from the face plates, the ends of the axle extend close to, and in some cases beyond, the outer faces of the plates.

In order to accommodate both driver and trailer wheels, it is necessary to provide a support for the sliding spindles which carry the centers, when they are in advanced position for the support of driving wheels, and to provide means for retracting the spindles and centers and permitting extension of the ends of the axle close to, or beyond, the outer surface of the face plates, when trailer wheels are supported.

Heretofore, in the usual lathe construction, there has been provided a flanged outboard bearing, centered by and bolted to each of the face plates, through which the spindles carrying the centers project and by which they are supported in advanced position. These outboard bearings are heavy and cumbersome and usually a hoist or crane is used for holding the bearings when removing them from the face plates for turning trailer-wheels or positioning them for turning drivers.

The object of my invention is to provide efficient outboard bearings of this character, which are carried by the face plates whether in use or not, and which can readily be swung into operative position by the lathe hand for turning drivers or swung into operative position by him for turning trailer wheels, without the use of a hoist. This is accomplished by hinging the bearing to the face plate and providing a conical seat for the bearing in the center of the face plate and a frustro conical projection on the inner face of the bearing which is arranged to engage the conical seat when the bearing is swung into spindle supporting position on the face plate, which is then secured to the face plate by means of bolts.

Having now indicated, in a general way, the nature and purpose of my invention, I will proceed to a detailed description thereof, with reference to the accompanying drawings, in which there is illustrated a preferred embodiment, and in which:—

Fig. 1 is a side view of a part of a driving wheel lathe, embodying my invention, set up for the support of a pair of driving wheels.

Fig. 2 is a view of the subject of Fig. 1, partly in section, set up for the support of a pair of trailer wheels.

Fig. 3 is a partial face view of a face plate.

Fig. 4 is principally a section of Fig. 3.

In the several figures, $a$ represents the bed of a driving wheel lathe provided with face plates $b$, between which are adapted to be mounted the wheels to be machined.

The face plates $b$ are adapted to be driven by suitably driven hollow spindles $c$ mounted in housings $d$ and through which extend the spindles $x$ carrying the centers $e$, adapted to engage the ends of the axle $f$ carrying the driving wheels $g$ or the ends of the axle $h$ carrying the trailer wheels $i$. The wheels $g$ are secured to the face plates by means of clamps $j$. The face plates are each provided centrally with a bore $k$ for the accommodation of the extended ends of the trailer wheel axle $h$ the outer ends of which apertures are tapered. The face plates are also each provided with a recess $m$ for the accommodation of the crank pins carried by the driving wheels $g$ when such wheels are turned and are also adapted to receive the outboard bearings when turning trailers as hereinafter described.

Each of the face plates is provided with an outboard bearing $n$ for the support of the spindles $x$, when the centers are advanced, beyond the outer face of the face plates, for engagement with the ends of the driving wheel axle $f$, as shown in Figure 1. The outboard bearings $n$ are pivotally secured, by means of pins $o$, to brackets $p$ bolted to the face plates and are adapted to be swung into and out of line with the centers $e$.

These outboard bearings are provided with flanges through which the securing bolts pass, the inner faces of which flanges engage their respective face plates. The inner faces of the outboard bearings are provided with frustro-conical portions which engage seats formed by the tapered outer portions of the bores $k$ in the face plates. The axis of the hinge pins are so positioned relative to the tapered seats and the frustro-conical portions on the outboard bearings as well as the recesses $m$, so as to properly position the outboard bearings in the face plate when said bearings are swung into driver turning position and to permit them to be swung into the recesses $m$ when said bearings are in trailer turning position.

When the outboard bearings $n$ are to be utilized for the support of the spindles $x$ when the centers are advanced to turn drivers. as shown in Figure 1, they are bolted to the face plates by means of bolts $q$, being centered in line with the spindles by the projection of their frustro-conical portions into the bores $k$, as clearly shown in Fig. 4.

When it is desired that the outboard bearings $n$ be removed to permit the accommodation of the ends of the trailer wheel axle $h$, as shown in Figure 2, the face plates are turned to bring the pins $o$ into a vertical position, the bolts $q$ are removed and the bearings swung on the pins $o$ until their forward ends enter the recesses $m$, in which position they are held by means of clamps $r$, carried in radial slots in the face plates.

The advantages of my invention result from the provision of outboard bearings for the center supporting spindles which are so hinged to the face plates that the said bearings can readily be swung into spindle supporting position for turning drivers or into position to permit entrance of the protruding ends of trailer axles into the bores in the face plates, with no more effort than is required to overcome the friction of the hinges on which the said bearings are supported. A further advantage of my invention arises from the provision of seats in the face plate for the reception of frustro-conical portions on the outboard bearings which are arranged to center said bearings when the said bearings are swung into spindle supporting position in the face plate, together with hinge pins so positioned on the face plate relative to the above mentioned seats and the crank pin receiving recesses, whereby the said bearings can be swung from spindle supporting position into said recesses where they will be out of the way when turning trailers.

Having now fully described my invention, what I claim and desire to protect by Letters Patent is:

1. A lathe having a pair of face plates, a pair of longitudinally movable spindles for supporting turning centers and arranged to be extended beyond the face plates, outboard bearings for the spindles pivotally mounted on the face plates and arranged to be swung into spindle supporting position or into nonsupporting position.

2. A lathe having a pair of face plates, a pair of longitudinally movable spindles for supporting turning centers and arranged to be extended beyond the face plates, outboard bearings swingable about a center into and out of position to support the spindles and means for centering the bearings relative to the spindles when the bearings are swung into spindle supporting position.

3. A lathe having a pair of face plates, a pair of longitudinally movable spindles for supporting turning centers and arranged to be extended beyond the face plates, and bearings pivotally mounted on the face plates and swingable into and out of spindle supporting position, there being tapered seats in the face plates concentric with the spindles, frustro-conical portions on the bearings arranged to engage the seats when the bearings are swung into spindle supporting position, and means for securing said bearings to the face plates in either position.

4. A lathe for turning locomotive wheels mounted on their axles, having a pair of face plates mounted for rotation, a turning center supporting spindle arranged to be moved along the axis of each face plate, there being an axle-receiving recess in each face plate concentric with the axis thereof, and a second recess in each face plate for the reception of a locomotive driving wheel crank pin, an outboard bearing pivotally mounted on each face plate for supporting a center supporting spindle when in one position for turning driver wheels and arranged to be swung into the second recess in the face plate when turning trailer wheels, and means for securing the said bearings to the face plates in either position.

5. A lathe for turning locomotive wheels mounted on their axles, having a pair of face plates mounted for rotation, a turning center supporting spindle arranged to be moved along the axis of each face plate, there being an axle-receiving recess in each face plate concentric with the axis thereof, and a second recess in each face plate for the reception of a locomotive driving wheel crank pin, an outboard bearing pivotally mounted on each face plate for supporting a center supporting spindle when in one position for turning driver wheels, there being tapered centering means on said bearings and face plates for centering the bearings when swung into such position, said pivots also being arranged to permit said bearings to be swung into the second recess in the face plate when turning trailer wheels, and means for securing the said bearings to the face plates in either position.

In testimony of which invention, I have hereunto set my hand, at Philadelphia, Pennsylvania, on this December 5th, 1925.

GEORGE H. BENZON, Jr.